United States Patent
Johnson et al.

(10) Patent No.: US 10,614,493 B2
(45) Date of Patent: Apr. 7, 2020

(54) SYSTEM AND METHOD FOR CUSTOMER DISCOUNT MANAGEMENT

(75) Inventors: Bradley Johnson, Allen, TX (US); John D'Auria, Plano, TX (US); Jason Gulledge, Frisco, TX (US)

(73) Assignee: SoftLayer Technologies, Inc., Dallas, TX (US)

( * ) Notice: Subject to any disclaimer, the term of this patent is extended or adjusted under 35 U.S.C. 154(b) by 559 days.

(21) Appl. No.: 13/191,583

(22) Filed: Jul. 27, 2011

(65) Prior Publication Data

US 2013/0030856 A1    Jan. 31, 2013

(51) Int. Cl.
*G06Q 30/04* (2012.01)
*G06Q 30/02* (2012.01)
*G06Q 10/06* (2012.01)
*G06Q 50/10* (2012.01)

(52) U.S. Cl.
CPC ....... *G06Q 30/04* (2013.01); *G06Q 10/06311* (2013.01); *G06Q 10/06312* (2013.01); *G06Q 10/063116* (2013.01); *G06Q 30/0207* (2013.01); *G06Q 50/10* (2013.01)

(58) Field of Classification Search
CPC combination set(s) only.
See application file for complete search history.

(56) References Cited

U.S. PATENT DOCUMENTS

| 6,988,097 B2 * | 1/2006 | Shirota | |
| 7,917,414 B2 * | 3/2011 | Nathanson | 705/35 |
| 8,713,476 B2 | 4/2014 | Martyn | |
| 2004/0128224 A1 * | 7/2004 | Dabney et al. | 705/37 |
| 2005/0065853 A1 * | 3/2005 | Ferreira | 705/26 |
| 2005/0119980 A1 * | 6/2005 | Kohavi et al. | 705/80 |
| 2007/0118419 A1 * | 5/2007 | Maga et al. | 705/10 |
| 2007/0124209 A1 * | 5/2007 | Walker et al. | 705/14 |
| 2007/0233574 A1 * | 10/2007 | Koegler et al. | 705/26 |

(Continued)

OTHER PUBLICATIONS

Trappey, A. et al. (2010). A framework of customer complaint handling system. IEEE. Nat'l Taipei Univ. of Tech. and Nat'l Tsing Hua Univ., Taiwan China.*

(Continued)

*Primary Examiner* — Peter Ludwig
(74) *Attorney, Agent, or Firm* — Schmeiser, Olsen & Watts, LLP

(57) ABSTRACT

A method comprises receiving a customer's service cancellation request associated with a selected service, generating and moving a ticket to a service queue, determining a discount amount to offer to the customer, updating a ticket with the discount offer, notifying the customer of the discount offer, receiving an acceptance of the discount offer from the customer, assigning the accepted discount amount to at least one billing item associated with the selected service, receiving a confirmation of the assigned discount by the user, updating the ticket with the confirmed discount assignment, receiving an approval of the discount assignment by a user, generating and storing a billing item record including the approved discount assignment for each of the at least one billing item, updating the ticket with the approved discount assignment, closing the ticket, and generating a customer invoice for a reduced invoice amount in response to the approved discount assignment.

7 Claims, 14 Drawing Sheets

(56) References Cited

U.S. PATENT DOCUMENTS

2008/0120129 A1\* 5/2008 Seubert et al. .................. 705/1
2009/0048980 A1\* 2/2009 Hubsher ......................... 705/80
2009/0157449 A1\* 6/2009 Itani et al. ........................ 705/7
2009/0249350 A1\* 10/2009 Senders et al. ............... 718/104
2011/0145084 A1\* 6/2011 Paone et al. ................. 705/26.1

OTHER PUBLICATIONS

Definition of "invoice" from World English Dictionary, 1998.\*
Internet Service Provider (ISP)—History and Development, retrieved on Apr. 24, 2015 from the Internet: <URL: http://ecommerce.hostip.info/pages/623/Internet-Service-Provider-ISP-HISTORY-DEVELOPMENT.html>, 2 pages.

\* cited by examiner

| Hardware Listing | | | | | |
|---|---|---|---|---|---|
| Servername | Notes | Public IP | Private IP | Datacenter | Action |
| server1.acme.com | | 123.456.7.89 | 10.1.1.1 | Dallas | Cancel Server |
| server2.acme.com | | 123.456.7.90 | 10.1.1.2 | Dallas | Cancel Server |
| server3.acme.com | | 123.456.7.91 | 10.1.1.3 | Dallas | Cancel Server |
| server4.acme.com | note text if there are notes | 123.456.7.92 | 10.1.1.4 | Dallas | Cancel Server |
| server5.acme.com | | 123.456.7.93 | 10.1.1.5 | Dallas | Cancel Server |
| server6.acme.com | | 123.456.7.94 | 10.1.1.6 | Seattle | Cancel Server |
| server7.acme.com | | 123.456.7.95 | 10.1.1.7 | Dallas | Cancel Server |
| server8.acme.com | | 123.456.7.96 | 10.1.1.8 | Dallas | Cancel Server |
| server9.acme.com | | 123.456.7.97 | 10.1.1.9 | Seattle | Cancel Server |
| server10.acme.com | | 123.456.7.98 | 10.1.1.10 | Dallas | Cancel Server |
| server11.acme.com | | 123.456.7.99 | 10.1.1.11 | Dallas | Cancel Server |
| server-b.company.com | | 9.87.65.1 | 10.1.1.12 | Dallas | Cancel Server |
| server-c.company.com | | 9.87.65.2 | 10.1.1.13 | Dallas | Cancel Server |
| server-d.company.com | | 9.87.65.3 | 10.1.1.14 | Dallas | Cancel Server |
| server-a.company.com | | 9.87.65.4 | 10.1.1.15 | Dallas | Cancel Server |

FIG. 6

Server: server1.acme.com
Public IP: 123.456.7.89
Private IP: 123.456.7.89

Cancellation Reason:
☐ Migrating to Larger Server
☐ Migrating to Smaller Server
☒ Migrating to a Different SoftLayer Datacenter
☐ Price is Too High
☐ Hardware Issues
☐ Network Issues
☐ Control Panel Issues
☐ OS/Application Issues
☐ Support Issues
☐ Lack of Features/Functionality
☐ Project Completed
☐ Require Fully Managed Solution
☐ Business Closing
☐ Consolidating Servers
☐ Moving To Competitor: [Comments]
☒ Other: [Customer comments go here]

41

Cancellation Note: [Note entered into this box]

42

[Cancel Server] — 43

Server Name
server1.betterses.198705.

Permanent Discounts:

| Billing Item Id | Description | Recurring | Discount Amount | Discounted Recurring | Percent Discount |
|---|---|---|---|---|---|
| 582181 | Quad Processor Quad Core Intel 7350 - 1.60GHz (Tigerton) - 4 x 4MB cache | $599.00 | $100 | $499.00 | 16.69% |
| 582182 | Quad Core Intel 7310 - 1.60GHz (Tigerton) - 4 x 4MB cache | $0.00 | | | |
| 582183 | Quad Core Intel 7310 - 1.60GHz (Tigerton) - 4 x 4MB cache | $0.00 | | | |
| 582184 | Quad Core Intel 7310 - 1.60GHz (Tigerton) - 4 x 4MB cache | $0.00 | | | |
| 582187 | 1000 Mbps Public & Private Networks | $20.00 | $20 | $0.00 | 100.00% |
| 582192 | 4 IP Addresses | $0.00 | | | |
| 582193 | Redundant Power Supplies | $0.00 | | | |
| 582194 | SA-SCSI RAID 1 Disk Controller | $50.00 | $25 | $25.00 | 50.00% |
| 582195 | 300GB SA-SCSI 15K RPM | $100.00 | $ | $100.00 | 0.00% |
| 582196 | 300GB SA-SCSI 15K RPM | $0.00 | | | |
| 582198 | Windows Server 2003 Enterprise SP2 with R2 (64 bit) | $100.00 | $ | $100.00 | 0.00% |
| 582199 | Microsoft SQL Server 2005 Standard (64 bit) | $900.00 | $ | $900.00 | 0.00% |
| 582209 | Host Ping and TCP Service Monitoring | $5.00 | | $5.00 | 0.00% |
| 582202 | 24x7x365 NOC Monitoring, Notification, and Response | $50.00 | $ | $50.00 | 0.00% |
| 582204 | Nessus Vulnerability Assessment & Reporting | $0.00 | | | |
| 915299 | 500GB SATA II | $30.00 | | $30.00 | 0.00% |
| 1991184 | 450GB SA-SCSI 15K RPM | $125.00 | $ | $125.00 | 0.00% |
| 1991185 | 30GB FB-DIMM Registered 533667 | $200.00 | $ | $200.00 | 0.00% |
| 2026304 | 450GB SA-SCSI 15K RPM | $125.00 | $ | $125.00 | 0.00% |
| 3481118 | Monitoring Package - Premium Application (65558827-10.georg.net) | $10.00 | | $10.00 | 0.00% |
| 3621770 | Discount for: SA-SCSI RAID 1 Disk Controller | $10.00 | | | |
| 3621771 | Discount for: Quad Processor Quad Core Intel 7310 - 1.60GHz (Tigerton) - 4 x 4MB cache | $50.00 | | | |
| 3621772 | Discount for: 1000 Mbps Public & Private Networks | $10.00 | | | |
| 3621773 | Discount for: 300GB SA-SCSI 15K RPM | $20.00 | | | |
| 3621774 | Discount for: Host Ping and TCP Service Monitoring | $5.00 | | | |
| 3621775 | Discount for: 24x7x365 NOC Monitoring, Notification, and Response | $15.00 | | | |
| 3621776 | Discount for: 500GB SATA II | $25.00 | | | |
| 3621777 | Discount for: 450GB SA-SCSI 15K RPM | $25.00 | | | |
| 3621779 | Discount for: 450GB SA-SCSI 15K RPM | $25.00 | | | |
| | Totals: | $2129.00 | $145.00 | $1984.00 | 6.81% |

Temporary Discounts:

| Billing Item id | Description | Recurring | Discount Amount | Discount Percent | Duration (months) | Discounted Recurring | Percent Discount |
|---|---|---|---|---|---|---|---|
| 582181 | Quad Processor Quad Core Intel 7310 - 1.60GHz (Tigerton) - 4x 4MB cache | $1984.00 | $96.80 | 20.00 | | $1587.20 | 20.00% |

[ ] Mark as Save    ☑ Add as Ticket Note Only

FIG. 9

Confirmation of Discounts:

Discounts Details:

server1.acme.com:

| Billing Item Id | Name | Date | Description | Recurring | Permanent Discount? | Discount Amount | Discount End Date | Discounted Recurring | Percent Discount | Date Applied |
|---|---|---|---|---|---|---|---|---|---|---|
| 582181 | server1.acme.com | 05-26-2011 | Quad Processor Quad Core Intel 7310 - 1.60GHz (Tigerton) -4 x 4MB cache | $599.00 | Yes | $100.00 | - | $499.00 | 16.69% | - |
| 582187 | server1.acme.com | 05-26-2011 | 1000 Mbps Public & Private Networks | $20.00 | Yes | $20.00 | - | $0.00 | 100.00% | - |
| 582194 | server1.acme.com | 05-26-2011 | SA-SCSI RAID 1 Disk Controller | $50.00 | Yes | $25.00 | - | $25.00 | 50.00% | - |
| 582181 | server1.acme.com | 05-26-2011 | Quad Processor Quad Core Intel 7310 - 1.60GHz (Tigerton) -4 x 4MB cache | - | No | $396.80 | 09-18-2011 | - | 20.00% | - |

Edit Discounts

FIG. 10

Internal Note:
*EMPLOYEE: bkjohnson - Technology - Business Application Development, DaI05 - 2011-May-26 09:43 (GMT-0500)*

The following discounts were added to this cancellation:

server1.acme.com

| Billing Item Id | Description | Recurring | Discount Amount | Discount End Date |
|---|---|---|---|---|
| 582181 | Quad Processor Quad Core Intel 7310 - 1.60GHz (Tigerton) - 4 x 4MB cache | 599 | 100 | Permanent |
| 582187 | 1000 Mbps Public & Private Networks | 20 | 20 | Permanent |
| 582194 | SA-SCSI RAID 1 Disk Controller | 50 | 25 | Permanent |
| 582181 | Quad Processor Quad Core Intel 7310 - 1.60GHz (Tigerton) - 4 x 4MB cache | 1964.00 | 396.8 | 2011-09-16 |

To Apply these discounts, please go to Apply Discounts.

Account Information
Account ID: 67354
Company Name: Acme Company
Next Bill Date: 06-17-2011

Application of Discounts:

The following discounts will be applied upon approval:

server1.acme.com:

| Billing Item Id | Name | Date | Description | Recurring | Permanent Discount? | Discount Amount | Discount End Date | Discounted Recurring | Percent Discount | Date Applied |
|---|---|---|---|---|---|---|---|---|---|---|
| 582181 | server1.acme.com | 05-26-2011 | Quad Processor Quad Core Intel 7310 - 1.60GHz (Tigerton) - 4 x 4MB cache | $599.00 | Yes | $100.00 | - | $499.00 | 16.69% | - |
| 582187 | server1.acme.com | 05-26-2011 | 1000 Mbps Public & Private Networks | $20.00 | Yes | $20.00 | - | $0.00 | 100.00% | - |
| 582194 | server1.acme.com | 05-26-2011 | SA-SCSI RAID 1 Disk Controller | $50.00 | Yes | $25.00 | - | $25.00 | 50.00% | - |
| 582181 | server1.acme.com | 05-26-2011 | Quad Processor Quad Core Intel 7310 - 1.60GHz (Tigerton) - 4 x 4MB cache | - | No | $399.80 | 09-18-2011 | - | 20.00% | - |

▸ Edit Discounts

The following note will be added to the ticket as an external note on approval:
The following permanent discounts have been applied to server1 (19070):
$25 SA-SCSI RAID 1 Disk Controller
$100 Quad Processor Quad Core Intel 7310 - 1.60GHz (Tigerton) - 4 x 4MB cache
$20 1000 Mbps Public & Private Networks Your SL account has been granted a 20.00% discount on server server1 (19070) for the next 4 month(s) beginning on 06-18-2011 and ending on 09-18-2011

Thank you for your business!
SoftLayer Accounting

[Apply Discounts]

SYSTEM AND METHOD FOR CUSTOMER DISCOUNT MANAGEMENT

FIELD

The present disclosure relates to a system and method for customer discount management.

BACKGROUND

For many service providers, attaining and maintaining a sizable customer-base is an important component of staying competitive in the marketplace. Customers comparison-shop for lower prices and are often willing to switch companies to get the cost savings. Accordingly, it becomes vital that a service provider company manage customer discounts in a organized and strategic manner.

SUMMARY

A system and method have been envisioned for managing customer discounts for a service provider.

A method of managing customer discounts comprises receiving a customer's service cancellation request associated with a selected service electronically, generating a ticket for tracking the service cancellation request, moving the ticket to a service queue, assigning the ticket to a customer service representative, determining customer eligibility for a discount for the selected service, determining a discount amount to offer to the customer in response to the customer being eligible for a discount, updating the ticket with the discount offer, notifying the customer of the discount offer electronically, receiving an acceptance of the discount offer from the customer electronically, in response to the acceptance, assigning the accepted discount amount to at least one billing item associated with the selected service, receiving a confirmation of the assigned discount by the customer service representative, updating the ticket with the confirmed discount assignment, moving the ticket to an accounting queue, receiving an approval of the discount assignment by an accounting associate, generating and storing a billing item record including the approved discount assignment for each of the at least one billing item associated with the selected service, updating the ticket with the approved discount assignment, closing the ticket, and generating a customer invoice for a reduced invoice amount in response to the approved discount assignment stored in the billing item records.

A computerized system and a computer-readable medium having stored therein computer code implementing a method of managing customer discounts are also disclosed.

BRIEF DESCRIPTION OF THE DRAWINGS

FIG. 6 is an exemplary graphical user interface of an exemplary web page for cancelling a service by a customer;

FIG. 7 is an exemplary graphical user interface of an exemplary web page for entering reasons for cancelling a service by a customer;

FIG. 8 is an exemplary graphical user interface of an exemplary web page for viewing a service cancelation request by a customer service representative;

FIG. 9 is an exemplary graphical user interface of an exemplary web page for entering discount amounts by a customer service representative;

FIG. 10 is an exemplary graphical user interface of an exemplary web page for confirming entered discount amounts by a customer service representative;

FIG. 11 is an exemplary graphical user interface of an exemplary internal note page for viewing and applying discounts associated with a cancellation ticket by an accounting associate;

FIG. 12 is an exemplary graphical user interface of an exemplary web page for editing entered discount amounts by a customer service representative;

FIG. 13 is an exemplary graphical user interface of an exemplary web page for reviewing and applying a discount by a customer service representative; and FIG. 14 is a exemplary representation of a report providing information about a customer's account and discounts.

DETAILED DESCRIPTION

Figure 1:
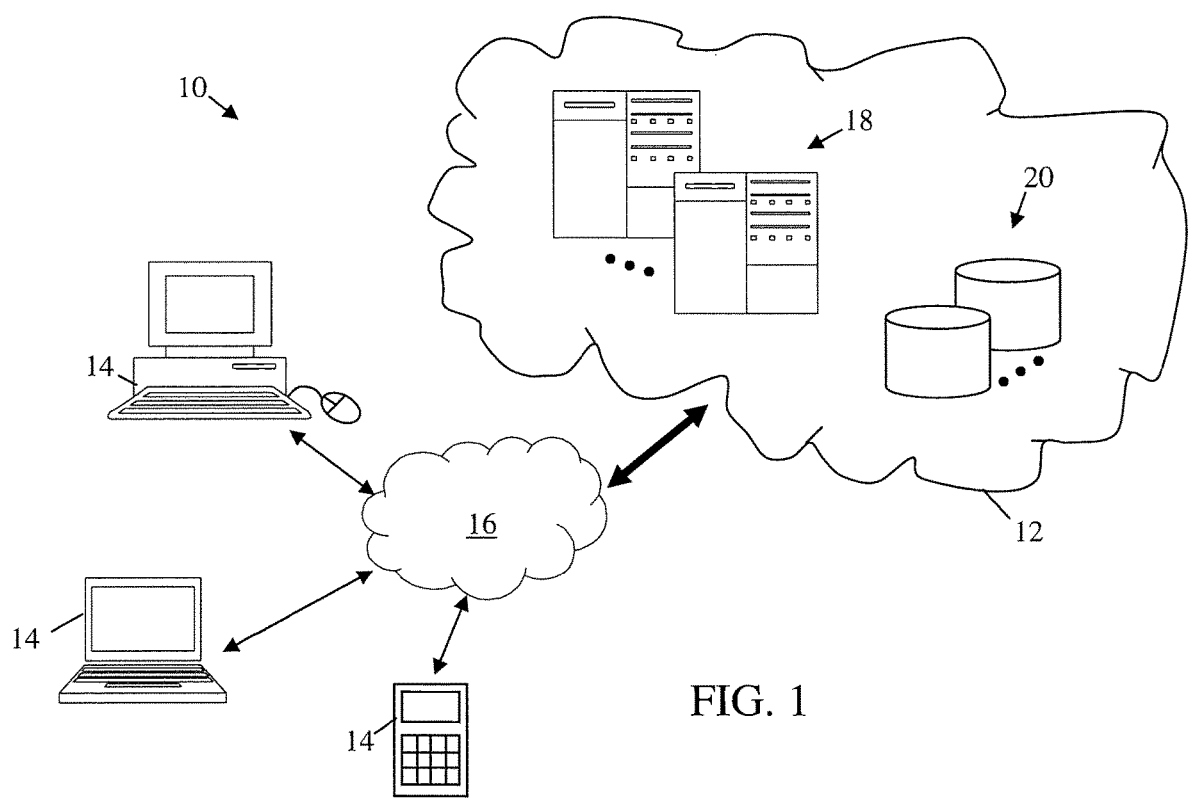
FIG. 1 is a simplified block diagram of an exemplary operating environment of a system and method for customer discount management.

FIG. 1 is a simplified block diagram of an exemplary operating environment 10 of a system and method for customer discount management. The cloud represents any type of Internet service provider 12 that provides hosting services accessible to customers 14 over a global computer network 16. For example, the Internet service provider 12 may be a cloud hosting provider that provides servers and software to its customers. Alternatively, the system and method described herein are applicable to any service provider which may communicate with its customers electronically via email, text message, multimedia message, web-based interface, etc. The term "service provider" is hereinafter used to refer to a provider of any type of service that may communicate with its customer over the global computer network and/or telecommunications network. For example, the term service provider may apply to telephone service providers, mobile telephone and data service providers, cable television service providers, satellite television service providers, newspaper, periodical or online information publishers, etc.

The service provider 12 may include a plurality of hardware such as servers 18 with accompanying operating system software and application software. The service provider 12 may further include a plurality of databases 20 (which may be in the form of tables or other suitable data stores) operable to store customer data as well as operational data. The databases 20 may store customer account data, service data, discount data, billing data, etc. described in more detail below.

Figure 2:
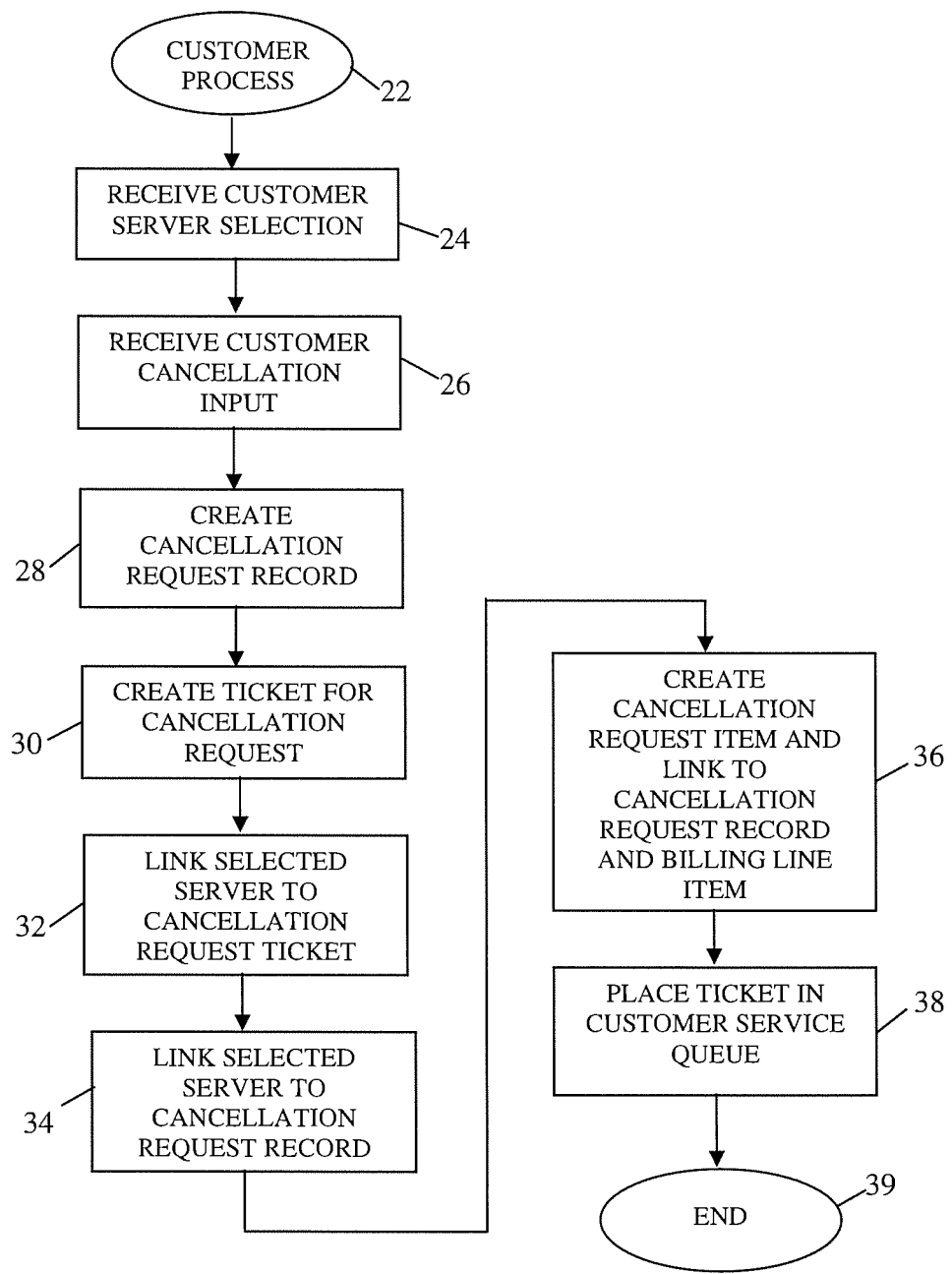
FIG. 2 is a simplified flowchart of an exemplary customer process of a system and method for customer discount management.

FIG. 2 is a simplified flowchart of an exemplary customer process 22 of a system and method for customer discount management. When a customer decides to cancel a service provided by the service provider 12, he/she may use a web browser to log into a web-based portal or user interface web page that enables the customer to manage desired actions associated with his/her account with the service provider. For example, the web interface may display a list of servers/services the customer currently obtain from the service provider 12, as shown in FIG. 6. Referring to both FIGS. 2 and 6, the listed information may include the names of the servers, the public and private IP addresses, the data center location, and the desired action. The customer may click on a particular server/service to highlight that item in the list (block 24 in FIG. 2), and click on the cancel server action link to initiate a service cancellation process.

Once the customer clicks on "cancel service," a cancellation form web page such as shown in FIG. 7 is automatically displayed to enable the customer to enter additional information. As shown in FIG. 7, the customer may indicate the reason for cancelling the service and provide additional notes to the service provider, if desired. The customer may then click on the cancel server button or link 27 to submit the cancellation request in block 26 as shown in FIG. 2. In response to the customer's submission of the cancellation request, a cancellation request record is automatically created in block 28. In block 30, a "ticket" is also automatically created for the cancellation request to assist in the processing and tracking of this request. The ticket is typically assigned a unique reference number or ticket identifier. In blocks 32 and 34, the server/service selected for cancellation is further linked to or associated with the cancellation request ticket, as well as the cancellation request record. Further, a cancellation request item record is automatically created, which is linked to or associated with the cancellation request record, and a billing line item record associated with the selected service in block 36. The cancellation request ticket is then placed in a customer service queue awaiting processing in block 38. The customer process ends in block 39.

Figure 5:
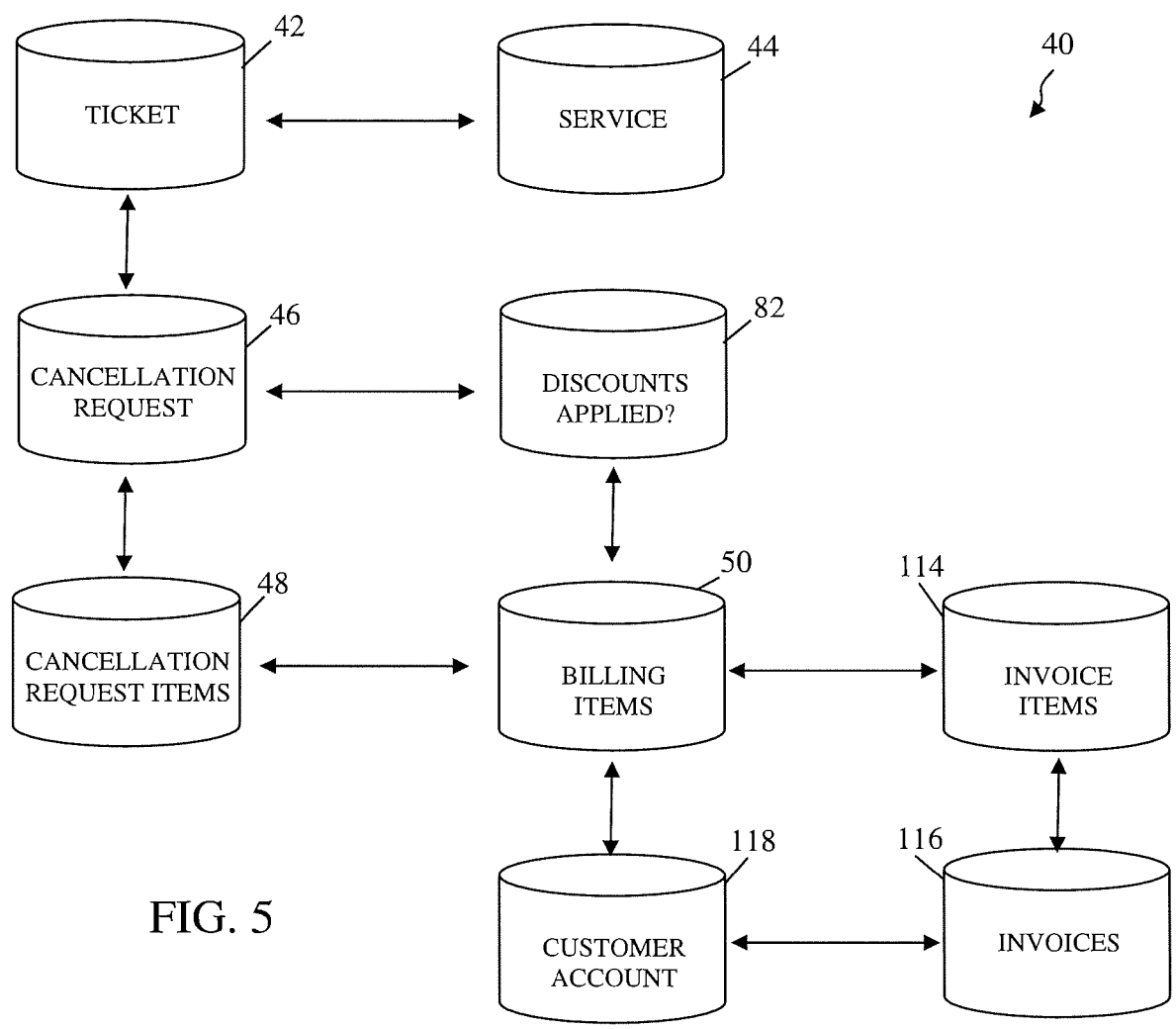
FIG. 5 is a simplified diagram representation of an exemplary data model of a system and method for customer discount management.

FIG. 5 is a simplified diagram representation of an exemplary data model 40 of a system and method for customer discount management. The data model 40 may be a relational database that includes the records created in the steps in FIG. 2 described above. A ticket data base 42 include information on the ticket contents, the user who submitted the ticket, and update and status data. The records in a cancellation ticket database 42 are linked to records in a service database 44 by a server or hardware identifier, for example. Each ticket has zero to many services attached: there is a lookup table (cross reference) that connects ticket to service. The service database 44 includes information specific to the services such as names, domains, and locations. The records in the cancellation ticket database 42 are further linked to records in the cancellation request database 46. Each cancellation request has one ticket: there is a foreign key in cancellation request that points to ticket. The cancellation request database 46 includes information such as status, and the employee identifier who approved or denied the cancellation request. The records in the cancellation request database 46 are in turn linked to the corresponding records in the cancellation request item database 48, which are used to link to records in a billing item database 50. The records in the cancellation request item database 48 correlate the records in the cancellation request database 46 to the records in the billing item database 50. Each cancellation request has one or more cancellation request items: there is a foreign key in cancellation request items that points to cancellation request. The cancellation request item database 48 includes the status of the individual billing items and the requested cancellation date. Each cancellation request item has one billing item: there is a foreign key in cancellation request items that points to billing item. The billing item database 50 includes information such as the recurring amount, type, description, and tax information. The "link" or association described herein may be implemented in a variety of ways now known or later developed. For example, relational database technology may be used to associate or link specific records in the databases.

Figure 3:
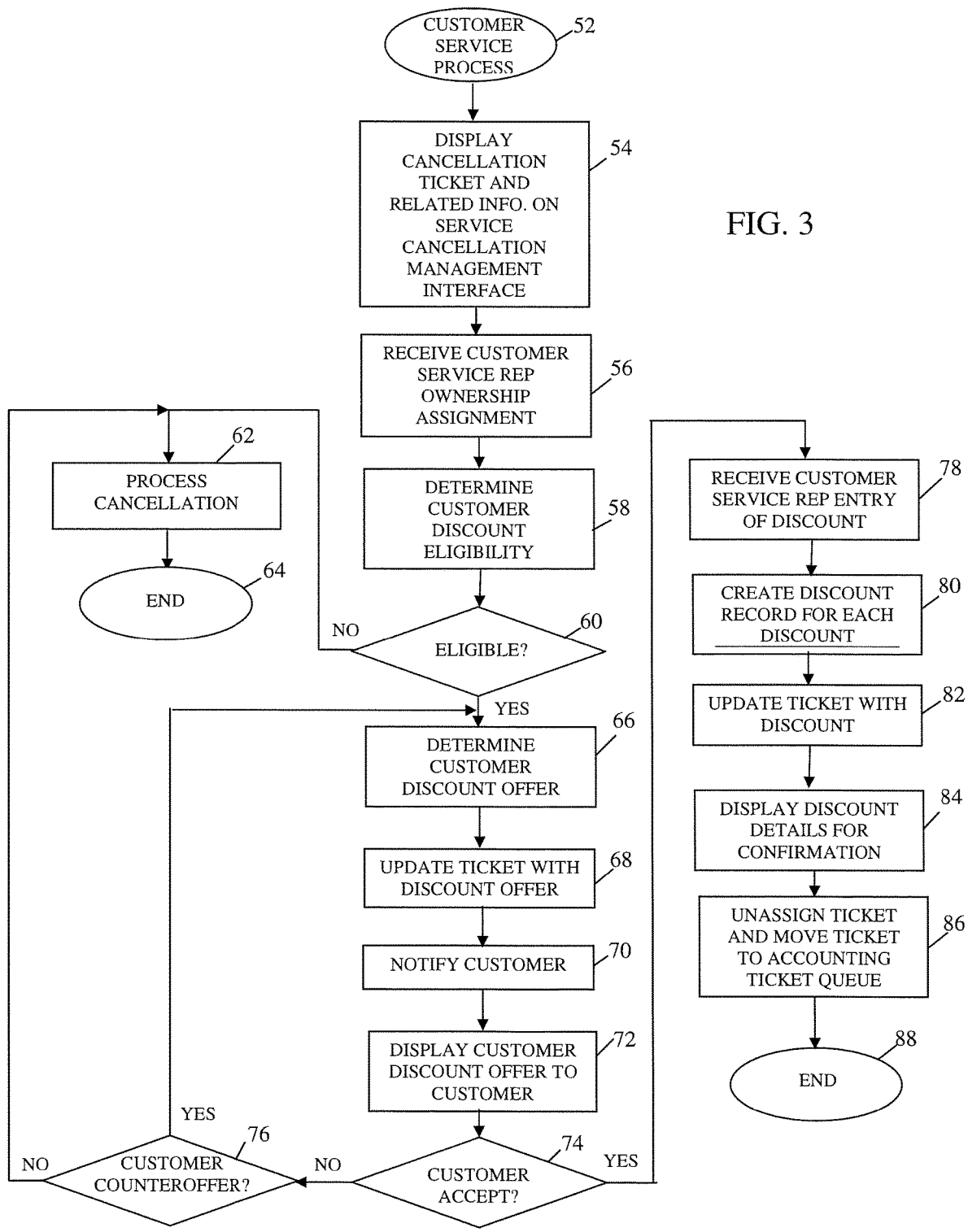
FIG. 3 is a simplified flowchart of an exemplary customer service process of a system and method for customer discount management.
Figure 8:
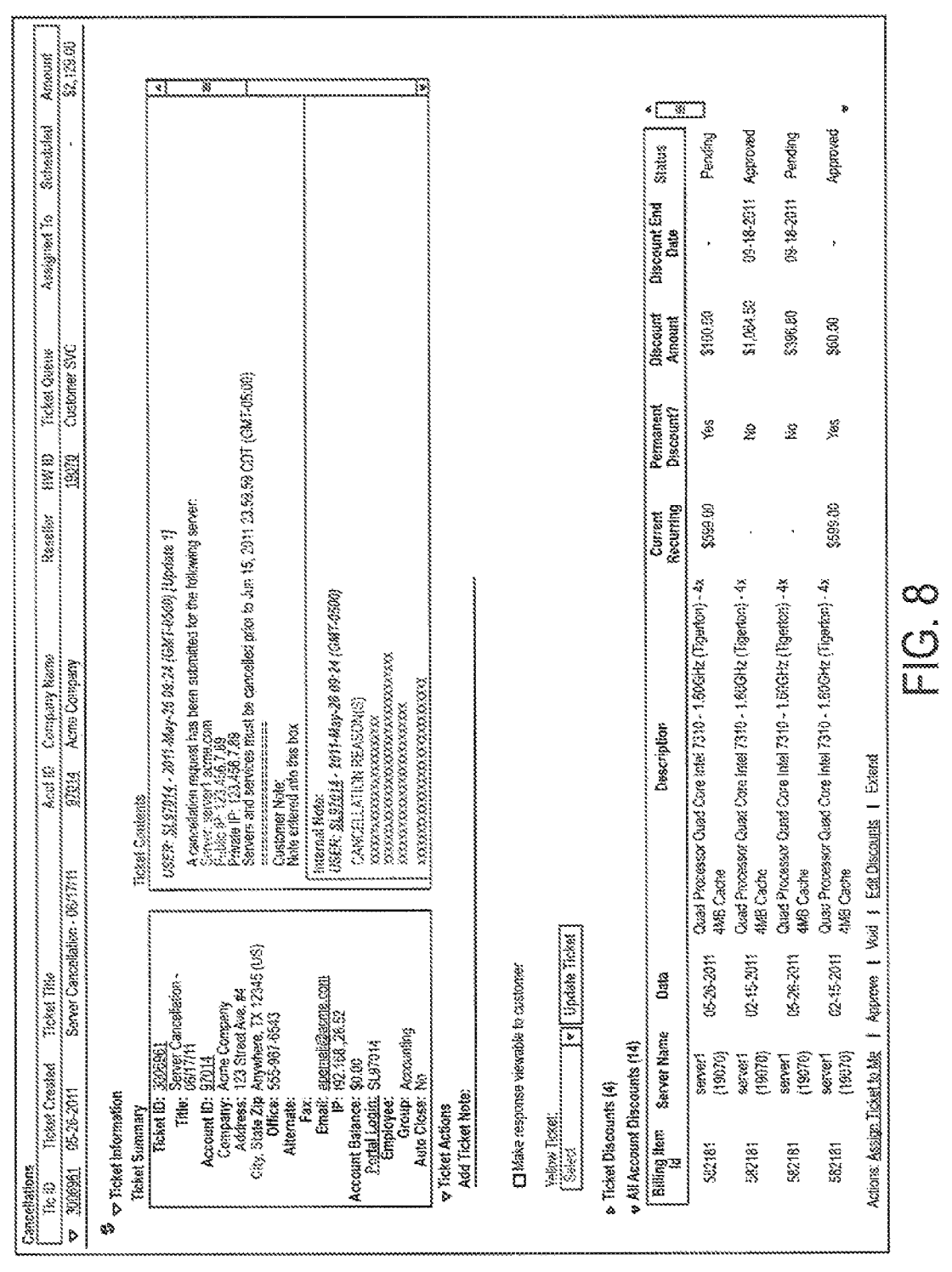

FIG. 3 is a simplified flowchart of an exemplary customer service process 52 of a system and method for customer discount management. As shown in block 54, the newly created cancellation request ticket described above is automatically displayed on a user interface used by the service provider's customer service representatives, a web-based interface example of which is shown in FIG. 8. The service cancellation management interface may be web-based, for example. The new ticket may be highlighted to catch the attention of a customer service representative. Referring to FIG. 8, the ticket displayed in the customer service queue includes detailed information of the requested cancellation, such as the ticket identifier, ticket creation date, title of the ticket, customer's account identifier, customer's company name, identifier of the server/service to be cancelled, ticket queue, and the total recurring fee for the service. As shown in block 56 of FIG. 3, a particular customer service representative may take ownership of the customer cancellation request by clicking on the "Assign Ticket to Me" link at the bottom of the screen shown in FIG. 8. Thereafter, a process 58 is used to determine whether the customer associated with the cancellation request is eligible for a temporary discount and/or a permanent discount. The process may consider several factors, including the total recurring fee for the service being cancelled, the total recurring fee for the customer, and the existence of any discounts the customer already enjoys. For example, if the customer already enjoys a significant discount, additional discounts may not be appropriate for this particular customer. On the other hand, if this customer has a significant business with the service provider as indicated by the total customer recurring fee, it may be appropriate to offer a discount to the customer to maintain the business relationship with this customer. Other suitable factors may be considered. The process may be carried out by a rule-based system, for example, with the opportunity for the customer service representative to override or tweak the amount of discount.

Continuing to refer to FIG. 3, in block 60, if it is determined that the customer is not eligible for a discount, the method proceeds to block 62 to terminate the selected service in the customer's account, and the process ends in block 64. Alternatively, if the determination is that the customer is eligible for a discount, then a determination is made as to the type and amount of discount to offer to the customer in block 66. A customer discount may be temporary, which has an expiration date, or it may be permanent, which is on-going with no expiration date. The permanent discount specifies a monetary amount reduced from the billing item each time the customer is billed for the service. Once a customer discount is decided, the discount information is added to the service cancellation ticket in block 68. The customer is then notified that an update to the service cancellation ticket has been made, and the discount information is displayed to the customer via the web page interface in blocks 70 and 72. The notification to the customer may be via any type of electronic communication now known or later developed, such as email, text message, multimedia message, web-based interface, etc. The customer notification includes options that the customer may use to reply to the discount offer. A determination is made as to whether the customer accepts the offered discount in block 74. If the customer did not accept the discount but instead made a counteroffer, as determined in block 76, then the process returns to block 66 to determine a new discount to offer to the customer by considering the customer's counteroffer. The new discount may be identical or different from the customer's counteroffer. If instead the customer turned down the offer and also did not provide a counteroffer, then the process proceeds to block 62 to cancel the selected service. On the other hand, the customer may indicate an acceptance of the discount, which leads the process to block 78.

In block 78, the customer service representative, upon notification of the customer's acceptance of the discount offer, may use a web-based interface such as that shown in FIG. 9 to enter the customer's discount into the system. As shown in FIG. 9, the web page displays the billing items associated with the selected server/service. The web interface displays the customer's billing items in two sections, the first section for the entry of permanent discounts and the second section for the entry of temporary discounts. The web page displays the billing item identifiers, descriptions, and recurring fee amounts of the billing items associated with the selected server/service. The customer service representative may associated the agreed-upon permanent discount on one or more billing items associated with the selected server. The customer service representative may enter a dollar amount or a percentage that would be discounted. In response to the entry of a discount amount on a billing item, a percentage of the discount is automatically calculated and displayed. A temporary discount is entered as an amount or a percentage, along with a specification of a duration in months that the discount would be in effect. Accordingly, the customer service representative enters the agreed-upon discounts into the system for processing by the accounting department. Instead storing the entered discount amounts or percentages into the system to be processed by the accounting department, a checkbox located at the bottom the page enables the customer service representative to save the entered data as a note associated with the cancellation request ticket only.

Figure 12:
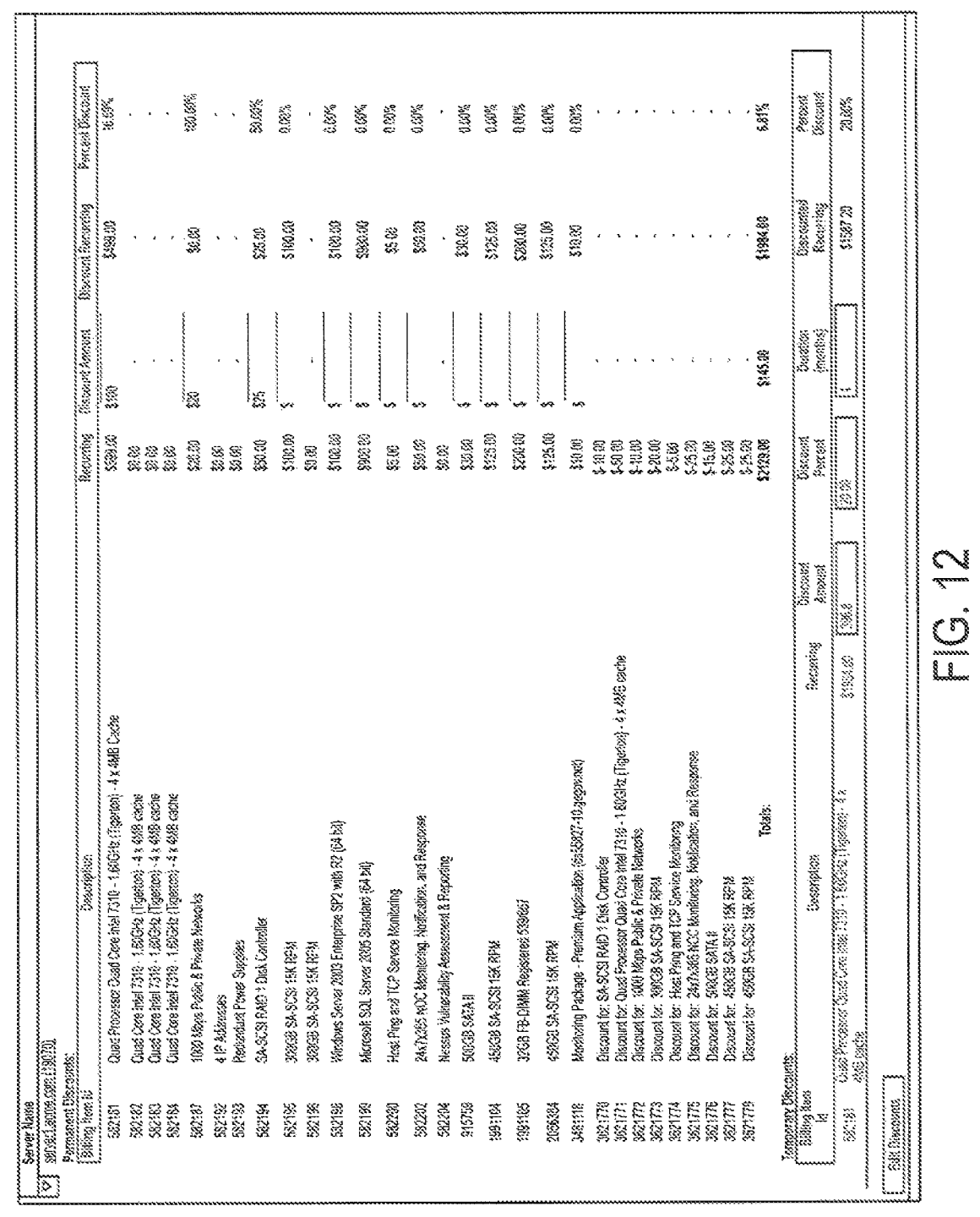

Returning to FIG. 3, the customer service representative's entries are received by the system in block 78 and stored in a discount database 82 (FIG. 5) as shown in block 80. The discount database 82 includes information such as the discount amount, whether the discount is permanent or temporary, an end date if the discount is temporary, and whether the discount has been applied. There are zero to many discounts for each cancellation request: there is a foreign key in discount that points to cancellation request. A discount record is generated for each billing item that received an assignment of a discount on the web-interface shown in FIG. 9. Further, an internal note that is only visible to the service provider describing the discounts offered to the customer is added to the cancellation ticket in block 82. An example of the internal note is shown in FIG. 11. As shown in FIG. 10, a confirmation of the discounts providing a summary of the discounts is displayed for final review by the customer service representative in block 84. If necessary, the customer service representative may return to the web interface shown in FIG. 12 to edit or change the discount by clicking on the appropriate link at the bottom of the page shown in FIG. 10. When the discounts are finalized, the cancellation request ticket is unassigned from the customer service representative in block 86, and the ticket is moved or transferred to an accounting ticket queue for processing. The customer service process ends in block 88.

Figure 4:
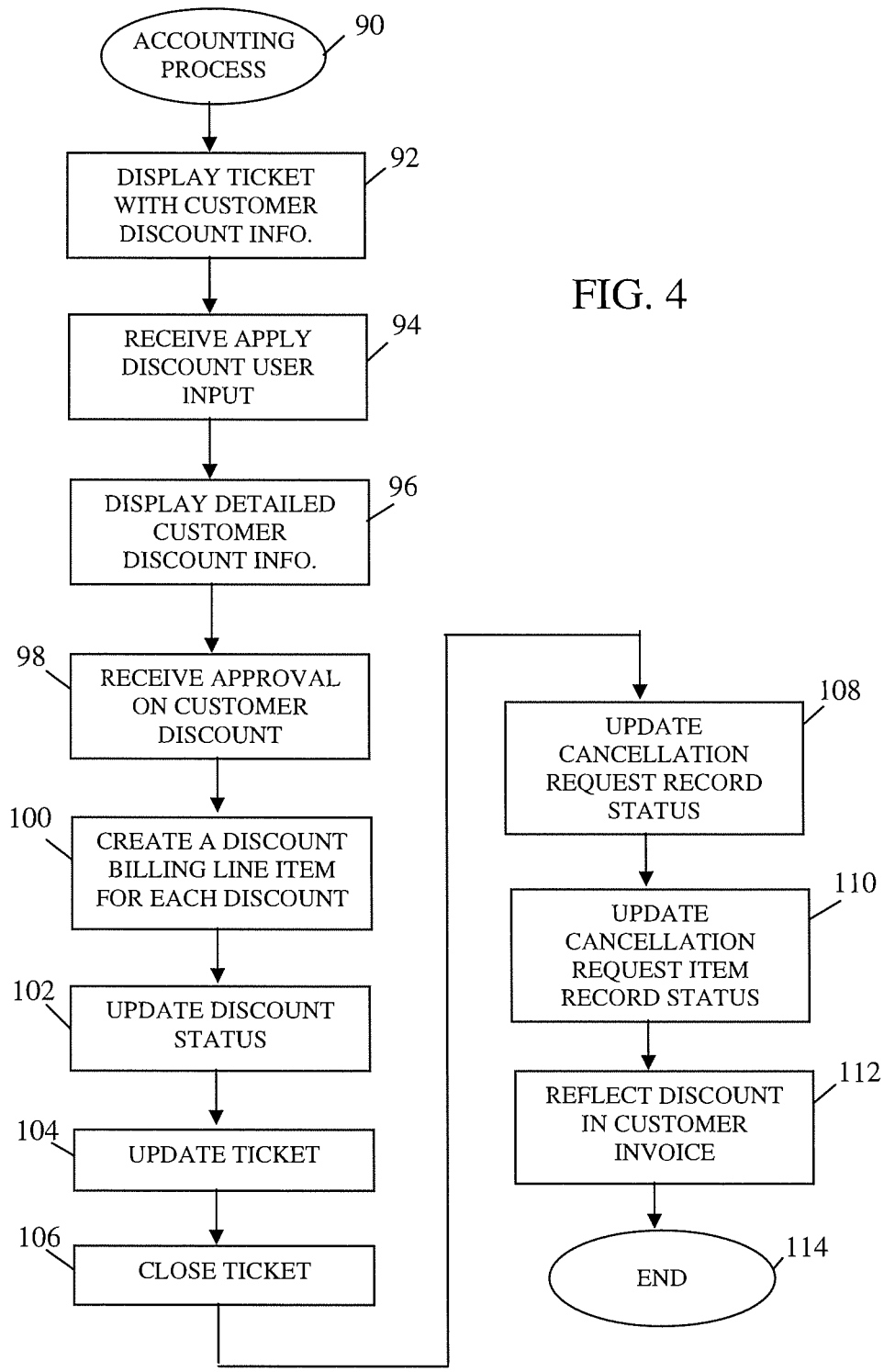
FIG. 4 is a simplified flowchart of an exemplary accounting process of a system and method for customer discount management.

FIG. 4 is a simplified flowchart of an exemplary accounting process 90 of a system and method for customer discount management. In block 92, the internal note page with the customer discount information associated with the cancellation ticket (FIG. 11) is displayed for viewing by an accounting associate. At the bottom of this note page is a link that may be clicked on to proceed to apply the discounts. In blocks 94 and 96, the process receives the apply discount user input, which leads to a display of the detailed customer discount information such as shown in FIG. 13. A suggested note to be added to the cancellation ticket is also displayed for review and editing, if desired. This note will be relayed to the customer as a notification that the discounts have been applied. Even at this step of the process, the discount may be edited by clicking on the appropriate link on this page. Once everything appears to be in order, the accounting associate may approve the discounts and apply them to the customer's account. The process receives the apply discount approval in block 98. The discounts are automatically added to the billing item records in the database 50 (FIG. 5) in block 100, and the billing item records in the billing item database 50 are automatically linked to the discount records in the discount database 82 by the billing item identifiers. Further, the status of the corresponding records in the discount database 82 is updated to "applied" in block 102. In block 104, the ticket is updated with the note that will be used to inform the customer of the discount described above and also any internal note that provides the status of the discounts. Further in block 106, the cancellation request ticket is closed. In blocks 108 and 110, the status of both the corresponding cancellation request and cancellation request item records in the databases 46 and 48 are updated to indicate completion. Next time the customer invoice is generated, it automatically reflects the applied discount, as shown in block 112. The billing process automatically creates a new invoice item record in an invoice items database 114 which is linked to the billing item record in the database 50 and invoice record in the invoices database 116. The invoice items database 114 includes information such as the associated billing items, amounts, tax information, name, and description. There are one to many invoice items for each invoice: there is a foreign key in invoice item that points to invoice. Both the billing item records in the billing item database 50 and the invoice records in the invoices database 116 are automatically linked to the records in the customer account database 118. Each invoice item has one billing item: there is a foreign key in invoice item that points to billing item. The invoices database 116 includes information such as status, billing contact information, tax status, and type of invoice. The customer account database 118 includes information such as name and contact information of the customer. There are zero to many billing items for each customer account: there is a foreign key in billing items that points to account. There are zero to many invoices for each customer account: there is a foreign key in invoices that points to account. The accounting process ends in block 120.

Figure 14:
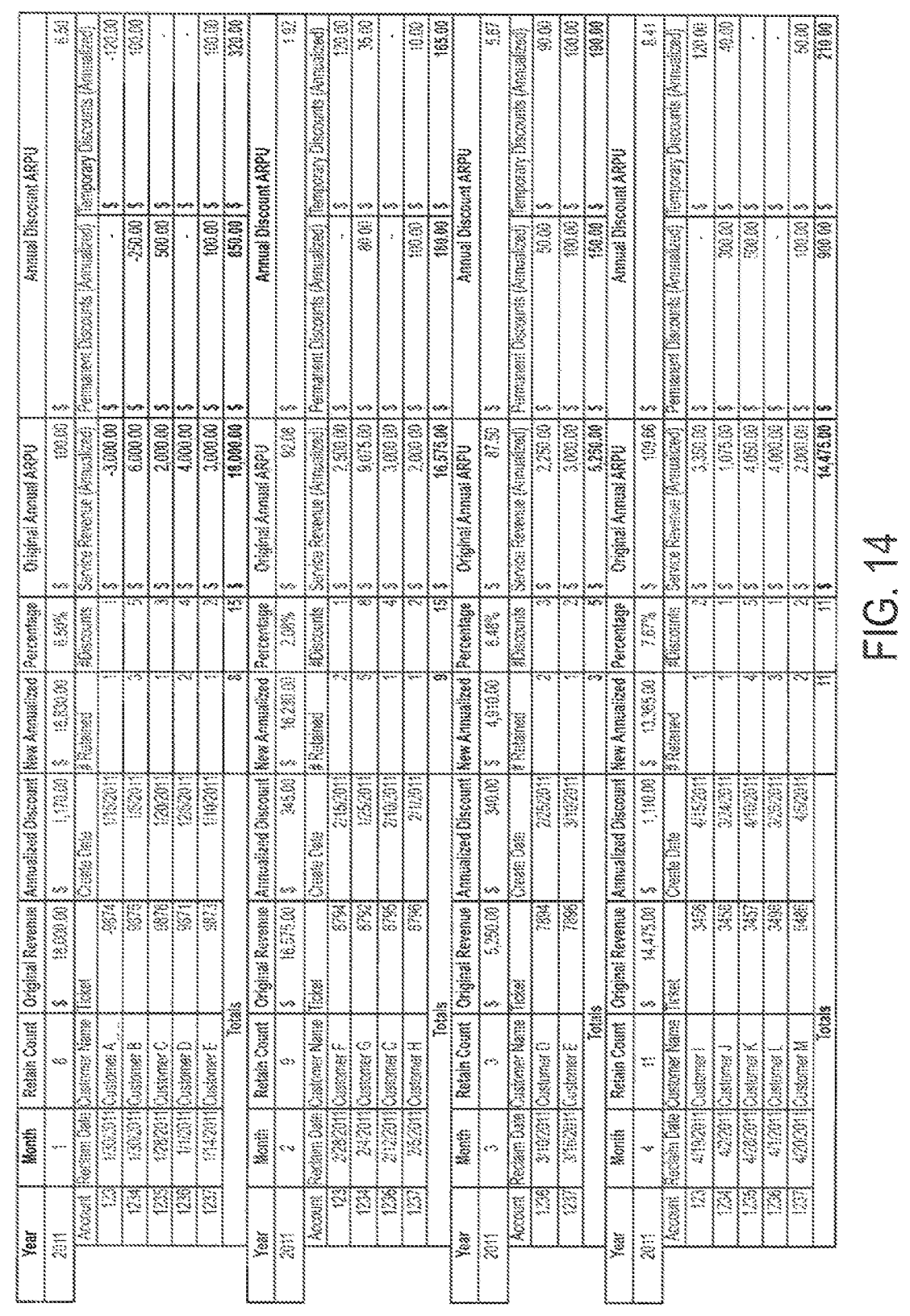

FIG. 14 is a exemplary representation of a report generated by the system and method that provides information about a customer's account and discounts. The reporting process is operable to automatically access the records in the databases shown in FIG. 5 to provide important financial information to the executives of the service provider. The report includes the amount of future revenue retained by offering the discounts to the customers as incentive not to cancel service. The report also includes a comparison of the reduction in revenue due to the discount to the amount of future revenue saved by avoiding the customer cancellation.

The report includes this information on an individual cancellation request basis as well as an aggregate monthly basis. The information included in this report enables an analysis for the total number of customer service cancellations that were prevented by using the customer discounts. Other data associated with the customer discounts may also be included in the reports.

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

What is claimed is:

1. A computer system, comprising: at least one server computer, wherein the at least one server computer includes at least one program stored thereon, said at least one program being capable of performing the following steps:
   displaying, by the at least one server computer to a customer, on a computer display screen, a menu comprising a list of servers with a selectable cancellation link for each listed server, wherein a cloud hosting service comprises a plurality of databases and the servers on the list of servers;
   receiving, by the at least one server computer, the customer's selection, from the menu, of a first cancellation link for a first server on the list of servers on the menu, wherein the received selection of the first cancellation link selects the first server and communicates that a first service associated with the selected first server is to be cancelled;
   in response to said receiving the selection of the first cancellation link, displaying, by the at least one server computer to the customer on the computer display screen, cancellation data that can be reached directly from the menu and includes limited data comprising an identification of the selected first server, a service cancel link, and a list of selectable reasons for cancelling the first service associated with the selected first server, wherein the cancellation data is displayed while the servers on the list of servers are in an un-cancelled state, wherein each selectable reason, of the limited data, is selectable in conjunction with cancelling the first service associated with the selected first server;
   in response to receiving, by the at least one server computer from the customer, a selection of the service cancel link and a selection, from the list of selectable reasons, of one or more reasons for cancelling the first service associated with the selected first server:(i) automatically generating, by the at least one server computer, a service cancellation request for cancelling the first service associated with the selected first server, (ii) automatically creating, by the at least one server computer, a cancellation request record in a table of a cancellation request database of the plurality of databases, wherein the cancellation request record comprises a status of the service cancellation request, and wherein the first service associated with the selected first server is linked to the cancellation request record, and (iii) automatically generating, by the at least one server computer, a ticket for tracking the service cancellation request;
   storing, by the at least one server computer, a ticket record in a table of a ticket database of the plurality of databases, wherein the ticket record includes ticket information on content of the ticket and further includes a status of the ticket, and wherein the cancellation request record includes a foreign key that points to the ticket;
   generating, by the at least one server computer, a cross reference lookup table in one database the plurality of databases that links the ticket to the first service associated with the selected first server, wherein a service database of the plurality of databases comprises information specific to the first service associated with the selected first server;
   creating, by the at least one server computer, a cancellation request item record in a table of a cancellation request items database of the plurality of databases, wherein the cancellation request item record comprises a status of a billing item associated with the first service associated with the selected first server and further comprises a requested cancellation date for cancelling the first service associated with the selected first server, wherein the billing item includes billing information pertaining to the first service associated with the selected first server, wherein the cancellation request item record comprises a first foreign key and a second foreign key, wherein the first foreign key points to the cancellation request record, wherein the second foreign key points to the billing item, wherein records in the cancellation request item database are used to link to records in a billing item database, and wherein the records in the billing item database comprise a billing item record;
   moving, by the at least one server computer, the ticket to a service queue;
   displaying, by the at least one server computer to the customer on the computer display screen, the ticket that is in the service queue.

2. The computer system of claim 1, wherein said at least one program is capable of performing the further steps of:
   after said moving the ticket to the service queue, assigning the ticket to a customer service representative;
   determining that the customer is eligible for a discount for the first service associated with the selected first server;
   determining a discount offer of a discount amount to offer to the customer in response to the customer being eligible for the discount;
   updating the ticket with the discount offer;
   in response to the customer's acceptance of the discount offer, assigning the discount amount to the billing item associated with the first service associated with the selected first server;
   receiving a confirmation, by the customer service representative, of the discount amount;
   updating the ticket with the confirmation of the discount amount;
   receiving, by an accounting associate, an approval of the discount amount; and
   after said receiving the approval of the discount amount and before closing the ticket, updating the ticket with the discount amount.

3. The computer system of claim 2, wherein said at least one program is capable of performing the further step of creating a discount record for the billing item in response to said assigning the discount amount to the billing item.

4. The computer system of claim 2, wherein the billing item record comprises a description of the first service associated with the selected first server, a frequency of the first service associated with the selected first server, the approval of the discount amount, and a percentage value: of the discount amount with respect to an overall cost of the first service associated with the selected first server.

5. The computer system of claim 2, wherein said at least one program is capable of performing the further steps of:
generating an invoice record in a table of an invoice database, wherein the invoice record comprises an invoice for a reduced invoice amount for the first service associated with the selected first server, and wherein the reduced invoice amount reflects the discount amount;
generating an invoice item record in a table of an invoice items database, wherein the invoice item record comprises the billing item,
wherein the invoice item record comprises a foreign key pointing to the invoice record, and
wherein the invoice item record comprises a third foreign key pointing to the billing item record.

6. The computer system of claim 1, wherein said at least one program is capable of performing the further steps of:
generating a customer account record in a table of a customer account database, wherein the customer account record comprises a name of the customer and contact information for contacting the customer, wherein the billing item record comprises a foreign key pointing to the customer account record.

7. The computer system claim 1, wherein said at least one program is capable of performing the further steps of:
after said moving the ticket to the service queue, displaying to the customer on the computer display screen, a discount offer of a discount amount for the first service associated with the selected first server;
after said displaying the discount offer, receiving the customer's acceptance of the discount offer and in response, displaying in another computer display screen, to a customer service representative assigned to the ticket, information pertaining to the discount amount accepted by the customer;
after said displaying, in the other computer display screen, the information pertaining to the discount amount, receiving an entry, in the other computer display screen from the customer service representative, data comprising the discount amount and receiving a selection by the customer service representative of a checkbox in the other computer display screen which triggers updating the ticket with the discount amount and generating an invoice, reflecting the discount amount for the first service associated with the selected first server; and
after said updating the ticket with the discount amount and said generating the invoice, closing the ticket.

\* \* \* \* \*